(12) United States Patent  
Einav (10) Patent No.: US 9,047,608 B1  
(45) Date of Patent: Jun. 2, 2015

(54) METHOD AND SYSTEM TO IMPROVE RISK ASSESSMENTS IN FRAUD DETECTION SYSTEMS USING MACHINE IDENTIFIERS

(75) Inventor: Yohai Einav, Saratoga, CA (US)

(73) Assignee: Symantec Corporation, Mountain View, CA (US)

( * ) Notice: Subject to any disclaimer, the term of this patent is extended or adjusted under 35 U.S.C. 154(b) by 717 days.

(21) Appl. No.: 13/222,824

(22) Filed: Aug. 31, 2011

(51) Int. Cl.  
*G06Q 10/10* (2012.01)  
*G06Q 30/02* (2012.01)  
*G06Q 10/06* (2012.01)  
*G06Q 99/00* (2006.01)  
*G06Q 30/00* (2012.01)

(52) U.S. Cl.  
CPC .................................... *G06Q 30/018* (2013.01)

(58) Field of Classification Search  
USPC ...................................... 726/25; 705/1.1–912  
See application file for complete search history.

(56) References Cited

U.S. PATENT DOCUMENTS

2008/0086759 A1* 4/2008 Colson ............................ 726/2  
2010/0228656 A1* 9/2010 Wasserblat et al. ............ 705/35  
2011/0125658 A1 5/2011 Lanxner et al.

* cited by examiner

*Primary Examiner* — Jonathan Ouellette  
(74) *Attorney, Agent, or Firm* — Lowenstein Sandler LLP (57) ABSTRACT

A computing system obtains data for a transaction pertaining to access to an application. The transaction data includes a machine identifier of a machine that is associated with the transaction. The computing system determines a percentile that is assigned to the machine identifier of the transaction based on cross-user transaction data for a plurality of transactions associated with a plurality of users. The percentile represents a number of machine identifiers from the cross-user transaction data that satisfy a count threshold that is associated with the machine identifier. The computing system modifies a user-level risk evaluation of the transaction based on the percentile assigned to the machine identifier and determines whether to intervene in the transaction based on the modified risk evaluation.

20 Claims, 7 Drawing Sheets

METHOD AND SYSTEM TO IMPROVE RISK ASSESSMENTS IN FRAUD DETECTION SYSTEMS USING MACHINE IDENTIFIERS

TECHNICAL FIELD

Embodiments of the present invention relate to fraud detection. Specifically, the embodiments of the present invention relate to improving risk assessments in fraud detection systems using machine identifiers

BACKGROUND

Identity theft and on-line fraud have become widespread problems in the United States. Each year, many adults in the U.S. have their identities stolen and numerous accounts are compromised, leading to significant losses as a result of identity theft. Weak authentication has led to Internet identity theft, phishing, and on-line financial fraud. As more consumers use computers and mobile devices for shopping, managing their finances, and accessing health care information, the risk of fraud and identity theft increases. Because of the impact of identity theft and on-line fraud on on-line businesses, more and more enterprises are evaluating authentication and security options for their on-line consumer base. The Federal Financial Institutions Examination Council (FFIEC) Guidance of 2005, which was updated in 2011, requires online financial institutions to apply strong authentication. Many fraud detection systems use a rules engine and a behavioral engine to assess the level of risk associated with an online transaction. Typical fraud detection systems analyze transactions at a user-level in that a behavioral engine learns how a consumer uses the system to dynamically identify risk. The fraud detection system responds when consumer behavior changes, even if the change does not break a general rule. For example, a behavioral engine goes on alert when a consumer who always logs on from home suddenly logs in from another country.

On average, 5% of a consumer's activity is unusual, but legitimate behavior, resulting in a high volume of transactions being falsely flagged as suspicious transactions in fraud detection systems. The level of the false positive rate is a large concern to enterprises using such fraud detection systems because a high level of false alerts can lead to enterprises unnecessarily investigating or intervening in a large number of transactions. Unwarranted investigations and interventions are costly for an enterprise. In addition, a high level of false alerts can detract from the true risky transactions. Traditionally, fraud detection systems have reduced the number of false positives by raising the risk threshold, such that transactions with lower risk scores would not be intervened or investigated. Such conventional solutions, however, miss the detection of real fraud transactions.

SUMMARY

In one embodiment, a system for improving a risk assessment for a transaction using percentiles assigned to machine identifiers is described. An exemplary system may include a memory and a processing device that is coupled to the memory. In one embodiment, the system obtains data for a transaction pertaining to access to an application. The transaction data includes a machine identifier of a machine associated with the transaction. The system determines a percentile that is assigned to the machine identifier of the transaction based on cross-user transaction data for transactions across multiple users. The percentile represents a number of machine identifiers from the cross-user transaction data that satisfy a count threshold that is associated with the machine identifier. The system modifies a user-level risk evaluation of the transaction based on the percentile assigned to the machine identifier and determines whether to intervene in the transaction based on the modified risk evaluation.

In one embodiment, the count threshold is a number of transactions per machine identifier or a number of distinct users per machine identifier. In some embodiments of the exemplary system, the system generates the user-level risk score for the transaction based on user behavior data and modifies the user-level risk score based on the assigned percentile. In one embodiment, the system modifies the user-level risk score by determining that the assigned percentile satisfies a percentile threshold, and decreases or increases the user-level risk score.

In one embodiment, the system further collects the cross-user transaction data for transactions across multiple users, wherein the transaction data includes a machine identifier and a user for each transaction, determines a number of transactions for each machine identifier using the transaction data and/or a number of distinct users for each machine identifier using the transaction data, creates a distribution of the machine identifiers based on the number of transactions for each machine identifier and/or the number of distinct users for each machine identifier, assigns a percentile to each machine identifier based on the distribution, and stores the percentile assignments of the machine identifiers in a data store that is coupled to the computing system. In one embodiment, the system determines a percentile that is assigned to the machine identifier of the transaction by searching the percentile assignments in the data store for a machine identifier that matches the machine identifier of the transaction.

In addition, a non-transitory computer readable storage medium for improving a risk assessment for a transaction using percentiles assigned to machine identifiers is described. An exemplary non-transitory computer readable storage medium includes instructions that will cause a processor to obtain data for a transaction pertaining to access to an application, determine a percentile that is assigned to a machine identifier of the transaction based on cross-user transaction data for transaction across multiple users, modify a user-level risk evaluation of the transaction based on the percentile assigned to the machine identifier, and determine whether to intervene in the transaction based on the modified risk evaluation.

Further, a method for improving a risk assessment for a transaction using percentiles assigned to machine identifiers is described. In one embodiment, a method comprises obtaining data for a transaction pertaining to access to an application, determining a percentile that is assigned to a machine identifier of the transaction based on cross-user transaction data for transaction across multiple users, modifying a user-level risk evaluation of the transaction based on the percentile assigned to the machine identifier, and determining whether to intervene in the transaction based on the modified risk evaluation.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for improving risk assessments of transactions using machine identifiers. A computing system obtains data for a transaction pertaining to access to an application. The transaction data includes a machine identifier of a machine associated with the transaction. The computing system determines a percentile that is assigned to the machine identifier of the transaction based on cross-user transaction data for transactions across multiple users. The percentile represents a number of machine identifiers from the cross-user transaction data that satisfy a count threshold that is associated with the machine identifier. The computing system modifies a user-level risk evaluation of the transaction based on the percentile that is assigned to the machine identifier and determines whether to intervene in the transaction based on the modified risk evaluation.

Embodiments of the present invention can reduce the number of transactions being falsely flagged as suspicious transactions in fraud detection systems and can help enterprises avoid costs related to investigating and intervening in the flagged transactions. Embodiments of the present invention can speed up the time taken to perform risk analyses of transactions by quickly identifying whether a machine identifier for a transaction is a frequently used or rarely used machine identifier as compared to other machine identifiers that have been monitored by the fraud detection system. Embodiments of the present invention can improve a risk analysis by using dynamic data, such as a periodic sample of most current cross-user transaction data.

Figure 1:
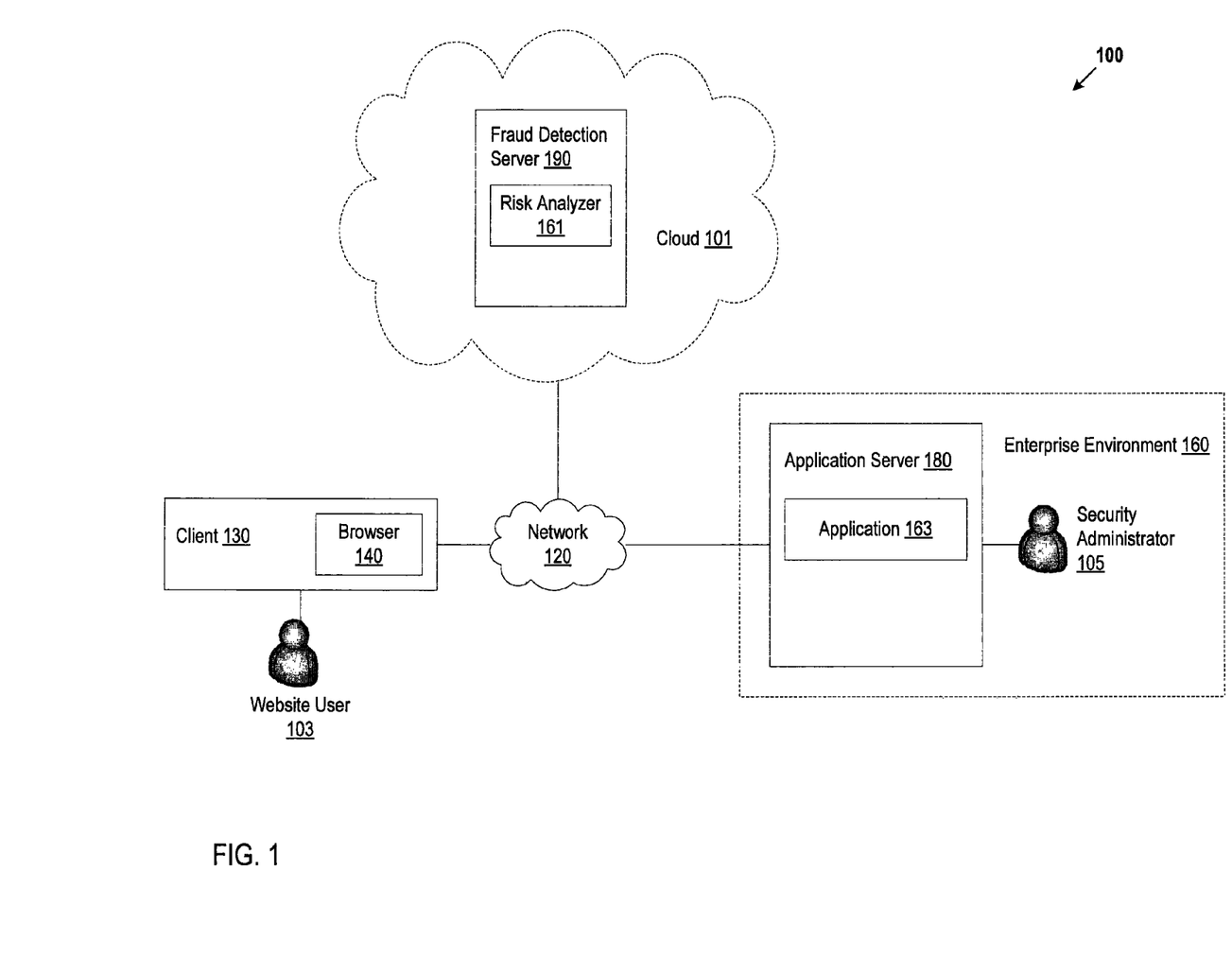
FIG. 1 is an exemplary network architecture in which embodiments of the present invention may operate.

FIG. 1 is an exemplary network architecture 100 in which embodiments of the present invention can be implemented. The network architecture 100 can include an enterprise environment 160 including one or more application servers 180 communicating with one or more fraud detections servers 190 and one or more clients 130 via a network 120. The network 120 can be a local area network (LAN), a wireless network, a mobile communications network, a wide area network (WAN), such as the Internet, or similar communication system.

The enterprise environment 160 can include one or more application servers 180 to host applications 163. An application 163 can be any type of application including, for example, a web application, a desktop application, a database management application, etc. A server 180 can be hosted by any type of computing device including server computers, gateway computers, desktop computers, laptop computers, hand-held computers or similar computing device. A client 130 can host a web browser 140, or similar application, to access an application 163. A client 130 can be hosted by any type of computing device including server computers, gateway computers, desktop computers, laptop computers, mobile communications devices, cell phones, smart phones, hand-held computers, or similar computing device.

A fraud detection server 190 can provide a real-time, fraud detection and monitoring service of applications 163. The fraud detection service can be a risk-based user and transaction monitoring service. In one embodiment, the service can be implemented as a cloud 101 to provide solutions to enterprises using cloud computing such as software as a service (SaaS) model in which software and services can be distributed on a subscription basis. The cloud 101 can include one or more fraud detection servers 190 to implement the SaaS model. A server 190 can be hosted by any type of computing device including server computers, gateway computers, desktop computers, laptop computers, hand-held computers or similar computing device. In another embodiment, the enterprise environment 160 can include one or more fraud detection servers 190.

A website user 103 may initiate a transaction using an application 163 website being monitored by a fraud detection server 190. Examples of types of transactions can include, and are not limited to, a log in, a purchase transaction using a credit card, an ATM transaction, a stock trade, electronic money movement, wire transfer, etc. The website user 103 can enter transaction data via the website, such as login credentials and/or credit card credentials, which the application server 180 can provide to the fraud detection server 190. The transaction data can include additional client, browser, operating system, and machine information. The fraud detection server 190 can perform a fraud analysis at the user-level by learning how the website user 103 accesses the application 163 website to dynamically identify risk. The fraud detection server 190 can generate a risk score using the transaction data to determine at the user-level whether the transaction is within the realm of what is considered "usual and customary" for this particular user 103. For example, if a user 103 living in Wisconsin travels infrequently, a transaction initiated from Utah can affect the risk score assigned to the transaction at the user-level. In another example, if a user 103 makes the majority of their purchases at retail online store sites, a transaction from an adult video site can also affect the transaction risk score at the user-level. The fraud detection server 190 can use the risk score assigned to the transaction at the user-level to categorize a transaction, for example, as low risk, medium risk, or high risk.

The fraud detection server 190 can include a risk analyzer 161 to dynamically improve the user-level risk assessment of a transaction being evaluated by analyzing risk of the transaction at an enterprise-level. An "enterprise-level" risk analysis includes the risk analyzer 161 using cross-user transaction data, which is the transaction data for multiple users being monitored by the fraud detection server 190. The risk analyzer 161 can modify the risk score that was generated at the user-level by analyzing the particular transaction relative to the cross-user transaction data at the enterprise-level. For example, the risk analyzer 161 can determine a machine identifier of a machine related to the transaction, such as a machine initiating the transaction, and determine whether the machine identifier is a frequently used machine identifier compared to the other machine identifiers being tracked by the fraud detection server 190. An example of a machine identifier can include, and is not limited to, an Internet Protocol (IP) address. The risk analyzer 161 can further refine the risk score created at the user-level based on the enterprise-level analysis. For instance, the risk analyzer 161 can analyze an IP address of the client 130 that initiated a transaction at the enterprise-level and increase or decrease a risk score based on the enterprise-level analysis. The risk analyzer 161 may determine that the particular IP address is a frequently used IP address based on historical cross-user transaction data that is collected by the fraud detection server 190 and may reduce the risk score to indicate that the transaction is not a high risk. Decreasing risk scores can reduce false positives in the fraud detection service. In another example, the risk analyzer 161 can improve the risk assessment of a transaction by increasing a risk score of a transaction. The risk analyzer 161 may determine that a particular IP address is an infrequently used IP address based on historical cross-user transaction data and may increase a risk score to indicate that the transaction is a high risk.

The fraud detection server 190 can use a modified risk score to determine whether a transaction should complete or whether the fraud detection server 190 should intervene in the transaction, such as requesting further authentication from the user 103. For instance, the fraud detection server 190 can send a challenge question or a response-required email to the user 103. An incorrect response from the user 103 can cause the transaction to fail. The fraud detection server can create a case for a high risk transaction to be investigated and/or to be intervened. The fraud detection server can send an alert identifying a risky transaction to one or more users, such as an enterprise security administrator 105 and/or a website user 103.

Figure 2:
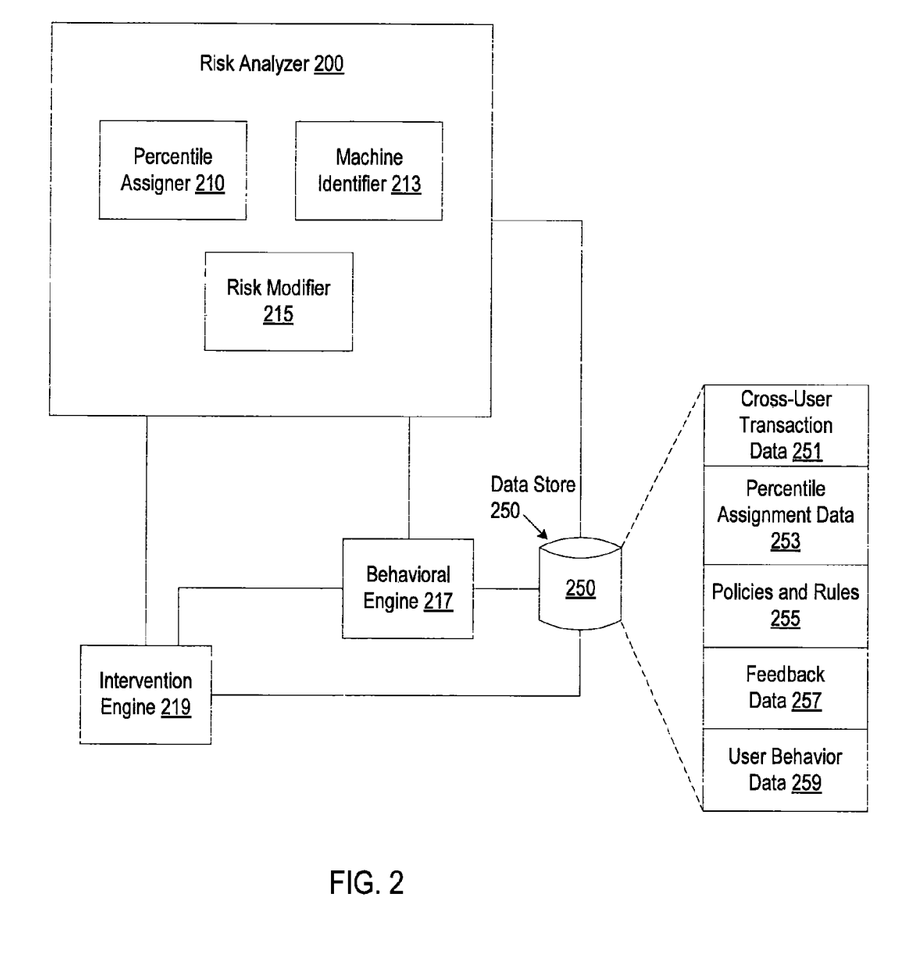
FIG. 2 is a block diagram of one embodiment of a risk analyzer for improving risk assessments of transactions using machine identifiers.

FIG. 2 is a block diagram of one embodiment of a risk analyzer 200 for improving risk assessments of transactions using machine identifiers. The risk analyzer 200 may be the same as the risk analyzer 161 hosted by a fraud detection server 190 in FIG. 1. The risk analyzer 200 includes a percentile assigner 210, a machine identifier 213, and a risk modifier 215. The components can be combined together or separated in further sub-components, according to a particular embodiment.

The risk analyzer 200 is coupled to a data store 250 that stores cross-user transaction data 251. The fraud detection server continually collects data for transactions associated with a number of users being monitored by the fraud detection server. In one embodiment, the fraud detection server receives transaction data for a transaction from an application server and adds the transaction data to the cross-user transaction data 251. In another embodiment, the fraud detection server receives the transaction data for a transaction from the machine initiating the transaction, such as a client computing machine, and adds the transaction data to the cross-user transaction data 251. The transactions can include previous successful transactions associated with multiple users and previous transactions associated with multiple users that have failed. The transactions can include current transactions associated with multiple users.

The cross-user transaction data 251 can include, without limitation, information related to each user (e.g., user credentials), the operating system used for each transaction, the browser type (e.g., Internet Explorer, Firefox, Chrome, or the like) for each transaction, the browser version for each transaction, the machine identifier (e.g., IP address) associated with each transaction, the geographical location of the machine identifier, date, time, or the like. The operating system and browser properties are derivatives of the User-Agent and the geographical location and connection are derivatives of the machine identifier (e.g., IP address). Information extracted from the IP address can be categorized as geographical location (e.g., country, city, state, longitude, latitude, or the like) and connection information (e.g., carrier, second level domain (SLD), organization, routing type, connection type, or the like). User-Agent derivatives (e.g., operating system, browser, or the like) and machine identifier (e.g., IP) derivatives (e.g., location, connection) can also be included. For money transfer transactions, information for the transaction can include, without limitation, the amount, the destination institution name, the destination institution country, and the transfer category.

In one embodiment, the percentile assigner 210 can periodically take a sample of the cross-user transaction data 251 and analyze the sample of the cross-user transaction data 251 to generate and/or update percentile assignment data 253. In one embodiment, the percentile assigner 210 can periodically analyze all of the cross-user transaction data 251 to generate and/or update percentile assignment data 253. The percentile assignment data 253 can be stored in the data store 250. One embodiment of generating and/or updating percentile assignment data 253 is described in greater detail below in conjunction with FIG. 6. The percentile assignment data 253 can include percentiles that are assigned to machine identifiers, such as IP addresses, that are associated with the transactions across multiple users. The percentile assigner 210 can determine a count for all of the machine identifiers in the cross-user transaction data 251 and assign a percentile rank to the machine identifiers by arranging the counts, for example, from lowest to highest. One embodiment of determining a percentile is described in greater detail below in conjunction with FIG. 6. In one embodiment, the count used to assign a percentile to the machine identifiers is a number of transactions per machine identifier. In another embodiment, the count is a number of distinct users per machine identifier. The percentiles that are assigned to the machine identifiers represent a percentile rank, which can be, in one embodiment, a number between 0 and 100 indicating a number of machine identifiers based on the cross-user transaction data 251 that satisfy a count threshold, such as have a count that is equal to or less than the count threshold. The count threshold can be specific to each machine identifier. The count threshold can be the count for the particular machine identifier. For example, the cross-user transaction data 251 includes data for 150 IP addresses. The percentile assigner 210 determines a count of a number of transactions per IP address for each of the 150 IP addresses within the system based on the cross-user transaction data 251. One of the IP addresses, 217.35.123.8, may have a count of 87 transactions. The count threshold for the IP address 217.35.123.8 is 87. The percentile assigner 210 determines that 113 of the 150 IP addresses have a count that is equal or less than 87. The percentile assigner 210 may determine that the percentile rank for IP address 217.35.123.85 is 75%.

In one embodiment, the percentile assigner 210 does not assign a zero percentile rank and uses the lowest count as the first percentile. In one embodiment, the percentile assigner 210 does not assign a $100^{th}$ percentile rank and uses the highest count as the 99th percentile.

In one embodiment, the percentile assignment data 253 includes assignments for all of the machine identifiers that have been analyzed by the fraud detection system. For example, the percentile assignment data 253 includes assignments for machine identifiers from the first percentile to the $99^{th}$ percentile. In another embodiment, the percentile assigner 210 creates a copy of a subset of the percentile assignment data 253 and stores the subset in the data store

250. For example, the subset may be the top percentile of the assignments. The top percentile can be a pre-defined and/or configurable range. The top percentile can be configured by a user, such as a system administrator. In one embodiment, the top percentile is configured as ninety-five percentile and above. In another example, the subset may be the bottom percentile of the assignments. The bottom percentile can be a pre-defined and/or configurable range. The bottom percentile can be configured by a user, such as a system administrator. In one embodiment, the bottom percentile is configured as five percentile and below.

In one embodiment, the fraud detection server includes a behavioral engine 217 that is coupled to the risk analyzer 200 and the data store 250 to perform a real-time risk assessment of transactions at a user-level as they occur. The behavioral engine 217 can monitor patterns of user behavior during on-line transactions and generate user behavior data 259 to reflect the patterns and a user-level analysis. For example, the behavioral engine 217 tracks characteristics of a user log-in from a location such as Mountain View, Calif., using the Firefox® browser and the Windows® operating system. For this transaction (a log-in transaction), several properties are associated with the transaction including the browser type, the operating system, and the like. The user behavior data 259 for patterns associated with financial transactions, such as a money transfer, can include a periodicity and a range of amount transferred. Using information related to the behavioral patterns in the user behavior data 259, the behavioral engine 217 can construct a user pattern and identify anomalies in the behavior, which can suggest that a transaction is suspicious if it does not follow the typical behavioral pattern for a particular user.

The behavioral engine 217 can form a risk score at a user-level for a given transaction utilizing the user behavior data 259 and both business logic rules and behavioral analysis. In one embodiment, the behavioral engine 217 includes and/or is coupled to a rules-based engine (not shown). The data store 250 can store policies and rules 255 that are pre-defined and/or configurable, for example, by an enterprise. The behavioral engine 217 can analyze various aspects of the transaction at a user-level, triggering one or more rules that result in the generation of alerts. The risk analyzer 200 and behavioral engine 217 can be coupled to an intervention engine 219 that generates alerts. For example, rules that could result in alerts include identification of a high risk IP address or an IP address associated with a risky country. Based on an analysis at the user-level, if a user has a previous transaction from a first location and the location of the current transaction is so far from the first location, such that travel between the first and current location is impossible, then the intervention engine 219 can generate an alert based on violation of a travel time rule. The intervention engine 219 can generate alerts based on rules and other analytical techniques in response to a transaction. For example, the intervention engine 219 can generate alerts if a transaction is categorized as an anomaly, if the transaction is performed at a time that is not a regular activity time for the user, or the like. The intervention engine 219 generates a variety of different alerts in response to violation of rules or outputs from the behavioral analysis for a transaction.

The behavioral engine 217 can aggregate the alerts into intermediate alerts, and in turn, can aggregate the intermediate alerts to create a risk score for the transaction at the user-level.

The machine identifier 213 accesses the cross-user transaction data 251 for a current transaction and identifies a machine identifier, such as an IP address, associated with the transaction, such as for a machine initiating the transaction. The risk modifier 215 compares the machine identifier that is associated with the current transaction and compares it to the percentile assignment data 253 to determine a percentile that is assigned to the machine identifier of the transaction.

The risk modifier 215 can search the percentile assignment data 253 for a machine identifier that matches the machine identifier associated with the transaction. In one embodiment, if there is not a matching machine identifier in the percentile assignment data 253, the risk modifier 215 assigns the first percentile to the machine identifier of the transaction. The risk modifier 215 modifies the current risk score (e.g., risk score generated at a user-level) for the transaction based on the assigned percentile from the analysis at the enterprise-level. For instance, the risk modifier 215 can increase or decrease the user-level risk score. The risk modifier 215 can apply one or more rules 255 that specify how to modify the user-level risk score using an assigned percentile. A rule can specify a percentile threshold and a corresponding risk score modification action for the risk modifier 215 to take. One embodiment for modifying a risk score based on an assigned percentile is described in greater detail below in conjunction with FIG. 4.

The intervention engine 219 that can determine whether the modified risk score satisfies a risk threshold to determine whether or not to intervene in the transaction. The risk threshold can be a pre-defined and/or a configurable value. The intervention engine 219 can intervene in the transaction, for example, by creating a case to investigate the transaction, sending a request for feedback to a user, etc. Examples of a request for feedback can include, and are not limited to, sending a challenge question, sending a response-required email, etc.

The intervention engine 219 can receive a feedback response from a user and determine whether the response is a valid response to allow the transaction to continue. The intervention engine 219 can use feedback data 257 that is stored in the data store 250 to determine whether the feedback response is valid to allow the transaction to continue. Feedback data 257 can include data used to validate the response, such as keys, algorithms, authorization codes, fingerprints, etc. An incorrect response from the user can cause the transaction to fail. The intervention engine 219 can send a message to the application server to allow the transaction to continue or to terminate the transaction.

The behavioral engine 217 can update the user behavior data 259 that is stored in the data store 250 based on the feedback response. A subsequent transaction using the same machine identifier may result in a lower risk score based on the updated user behavior data 259.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
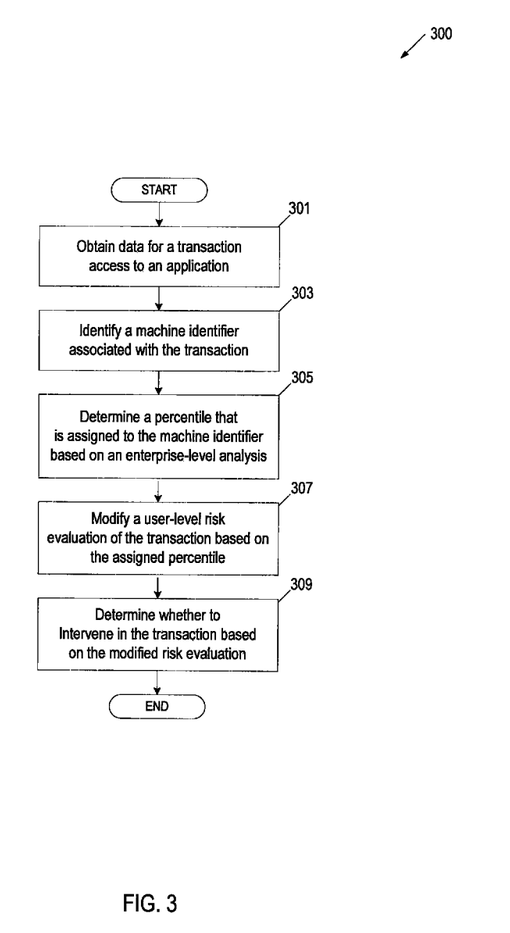
FIG. 3 is a flow diagram of an embodiment of a method for improving risk assessments of transactions by analyzing machine identifiers at an enterprise-level.

FIG. 3 is a flow diagram of an embodiment of a method 300 for improving risk assessments of transactions by analyzing machine identifiers at the enterprise-level. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a risk analyzer 161 hosted by a fraud detection server 190 in FIG. 1. At block 301, processing logic obtains transaction data for a particular transaction pertaining to access to an application. The transaction data can be received from an application server, and/or received from a machine initiating the transaction. The transaction data can include a machine identifier, such as an IP address, of the machine associated with the transaction. At block 303, processing logic identifies a machine identifier associated with the transaction.

At block 305, processing logic determines a percentile that is assigned to the machine identifier of the transaction based on an enterprise-level analysis. One embodiment of performing an enterprise-level analysis to assign percentiles to machine identifiers is described in greater detail below in conjunction with FIG. 6. Processing logic can search percentile assignment data that is stored in a data store that is coupled to the risk analyzer for a machine identifier that matches the machine identifier associated with the transaction. The percentile represents a number of machine identifiers that satisfy (e.g., have a count that is equal to or less than) a count threshold that is associated with the machine identifier. In one embodiment, the percentile is based on a number of transactions per machine identifier. In another embodiment, the percentile is based on a number of distinct users per machine identifier. For example, an IP address, 217.35.123.8, has a count of 87 transactions. The count threshold for this particular IP address is 87. The percentile assignment data includes a 75% rank that is assigned to the IP address 217.35.123.8. The 75% percentile rank represents the number of machine identifiers that have counts that are equal to or less than 87. Processing logic may search percentile assignment data and find a machine identifier that matches the machine identifier associated with the transaction. The matching machine identifier has a 75% percentile rank. In one embodiment, if there is not a matching machine identifier in the percentile assignment data, processing logic assigns a first percentile to the machine identifier of the transaction.

At block 307, processing logic modifies a user-level risk evaluation of the transaction based on the assigned percentile. Processing logic may have previously generated a user-level risk score for the transaction from conducting a user-level analysis using user behavior data for the transaction. Processing logic can increase or decrease the user-level risk score. One embodiment of increasing or decreasing a user-level risk score is described in greater detail below in conjunction with FIG. 4.

Figure 4:
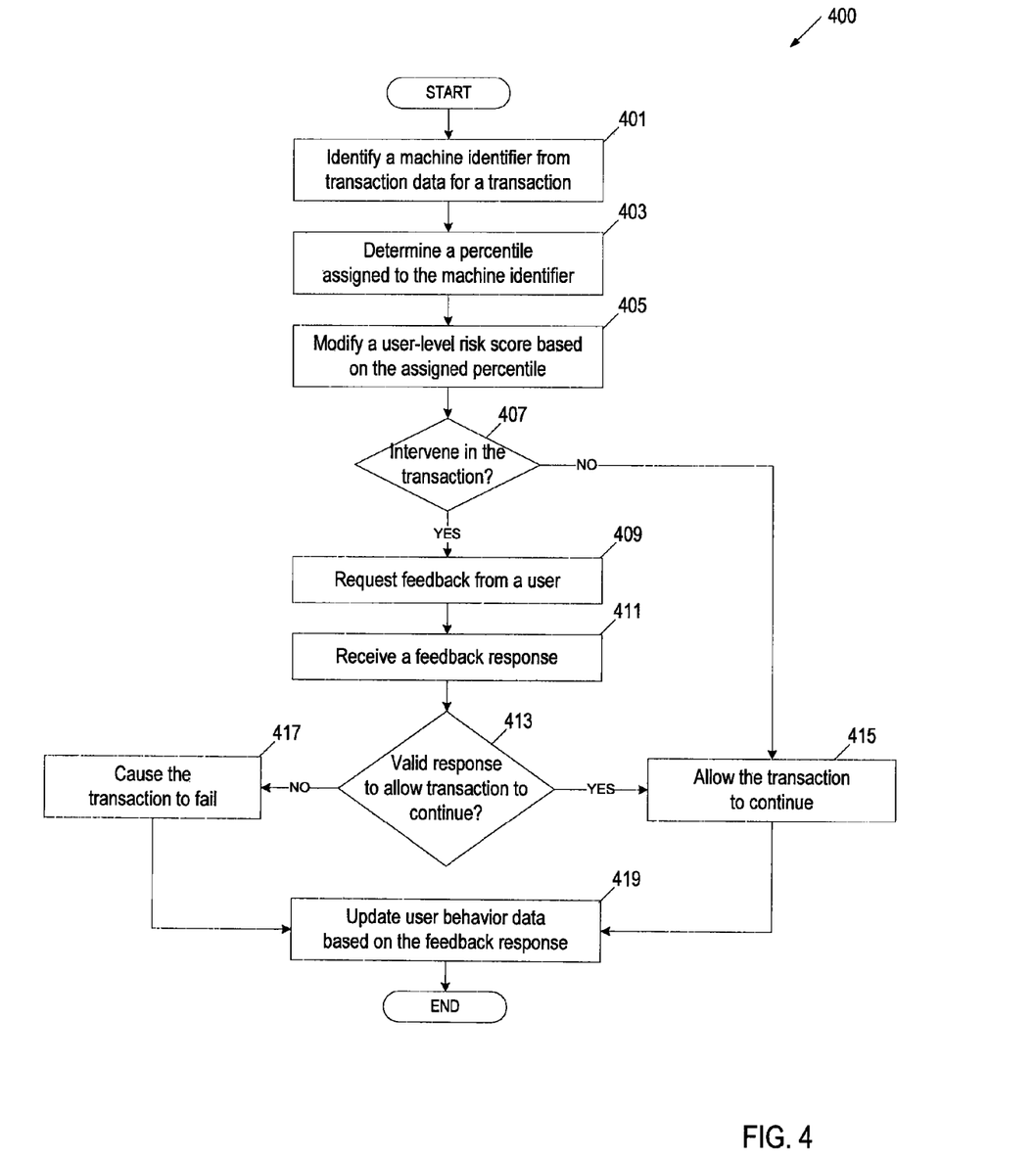
FIG. 4 is a flow diagram of an embodiment of a method for modifying a risk score for a transaction using percentiles assigned to machine identifiers from an enterprise-level analysis.

At block 309, processing logic determines whether to intervene in the transaction based on the modified risk evaluation. The percentile can be an indication of a risk of fraud that is associated with the machine identifier. Processing logic can improve the risk assessment by reducing the amount of time taken to perform risk analyses of transactions by quickly identifying whether a machine identifier for a transaction is a frequently used or rarely used machine identifier. For example, a machine identifier that is assigned a high percentile (e.g., 95%) can represent a frequently used machine identifier and indicate a low risk of fraud for the transaction for a specific website. Studies of website traffic have shown that 70% of a website's transactions originate from 5% of the IP addresses connecting to the website. A majority of a website's traffic falls within the IP addresses in the ninety-five percentile and above. A particular study analyzing online banking websites reveal the same results. Most of online banking logins result from frequently used IP addresses. The studies indicate that very few fraud attempts are generated from the top 5% of IP addresses that access a website.

In another example, a machine identifier that is assigned a low percentile (e.g., 5%) can represent a rarely used machine identifier and indicate a high risk of fraud for the transaction. Studies have shown that fraudsters would rarely connect to a website using IP addresses that frequently connect to the website. The studies reveal that IP addresses that scarcely access a website are riskier than IP addresses that frequently access a website. One embodiment of determining whether to intervene in the transaction is described in greater detail below in conjunction with FIG. 4.

FIG. 4 is a flow diagram of an embodiment of a method 400 for improving a risk assessment for a transaction using percentiles assigned to machine identifiers from an enterprise-level analysis. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a risk analyzer 161 hosted by a fraud detection server 190 in FIG. 1.

At block 401, processing logic identifies a machine identifier (e.g., IP address) from the transaction data for a transaction that is being analyzed and determines a percentile that is assigned to the machine identifier at block 403. Processing logic can search percentile assignment data that is generated from an enterprise level analysis and stored in a data store that is coupled to the risk analyzer for a machine identifier that matches the machine identifier associated with the transaction. In one embodiment, processing logic searches a copy of a subset of the percentile assignment data that is stored in the data store. For example, the subset may be the top percentile of the assignments, such as a ninety-five percentile and above. One embodiment of assessing risk using a subset of percentile assignment data representing a top percentile is described in greater detail below in conjunction with FIG. 5. In another example, the subset may be the bottom percentile of the assignments, such as a five percentile and below. In another embodiment, processing logic searches all of the percentile assignments from the lowest to the highest percentile for a machine identifier that matches the machine identifier associated with the transaction. Processing logic can locate a matching machine identifier and identify the percentile that is assigned to the matching machine identifier. In one embodiment, if there is not a matching machine identifier in the percentile assignment data, processing logic assigns the first percentile to the machine identifier of the transaction.

At block 405, processing logic modifies a user-level risk score based on the assigned percentile and policies and/or rules that are stored in the data store. A policy and/or rule can specify a percentile threshold and a corresponding risk score modification action to be taken. For example, a policy may specify that when an assigned percentile is in the top percentile (e.g., ninety-five percentile and above), processing logic can change the user-level risk score for the transaction to a zero risk score. A zero risk score can indicate that there is no risk associated with the transaction. In another example, a policy may specify that when an assigned percentile is in the top percentile, processing logic reduce the user-level risk score for the transaction by a pre-defined value and/or configurable value. In another example, a policy may specify that when an assigned percentile is in the bottom percentile (e.g., five percentile and below), processing logic increases the user-level risk score for the transaction by a pre-defined and/or configurable value.

At block 407, processing logic determines whether the modified risk score satisfies a risk threshold to determine whether or not to intervene in the transaction. For example, on a risk scale of 0 to 100, a case creation or risk threshold can be set at 50. Processing logic can create a case and/or intervene in any transaction that has accumulated a risk score of 50.

If the determination is to not intervene in the transaction (block 407), processing logic can allow the transaction to continue at block 415. If the determination is to intervene in the transaction (block 407), processing logic can intervene in the transaction by sending a request for feedback to a user at block 409. For example, processing logic can send a request for a secondary authorization of the transaction to a website user, such as sending a challenge question or a response-required email. In another example of intervention, processing logic can generate an alert and send the alert to one or more users, such as an enterprise system administrator, a website user, etc., and processing logic can wait for a response to the alert from a user.

At block 411, processing logic receives a feedback response from at least one user and determines whether the feedback response is valid to allow the transaction to continue at block 413. For example, processing logic receives a challenge answer from a website user. In another example, processing logic receives second-factor authentication credentials (e.g., authorization code, pin, virtual token, physical token, one-time password, fingerprint, etc.) from a website user. Processing logic can use feedback data that is stored in the data store to determine whether the feedback response is valid to allow the transaction to continue. If the response is valid (block 413), processing logic allows the transaction to continue at block 415. In one embodiment, processing logic can send a message to the application server to allow the transaction to continue. If the response is not valid (block 413), processing logic can cause the transaction to fail at block 417. In one embodiment, processing logic can send a message to the application server to terminate the transaction.

At block 419, processing logic updates the user behavior data that is stored in the data store based on the feedback response. The updates can indicate the risk analysis results and actions taken in response to this particular machine identifier. For example, processing logic determines that the IP address of the transaction does not have an assigned percentile that is ninety-five percentile or above and sends a request to a user for a virtual token. Processing logic successfully validates the virtual token, allows the transaction to continue, and updates the user behavior data to indicate that the transaction was allowed for this particular machine identifier. A subsequent transaction using the same machine identifier may result in a lower risk score based on the updated user behavior data.

Figure 5:
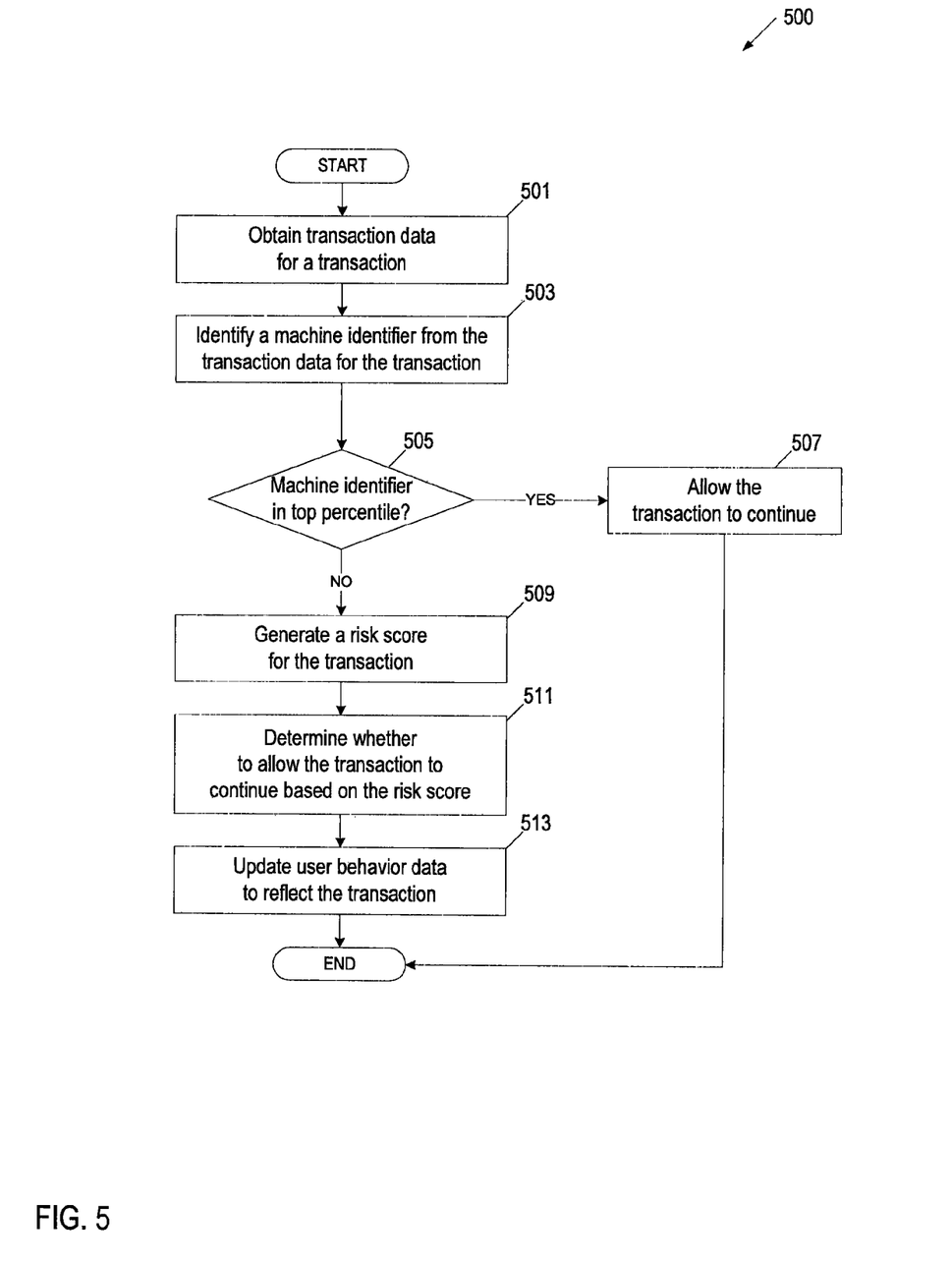
FIG. 5 is a flow diagram of an embodiment of a method for assessing risk using a subset of percentile assignment data representing a top percentile.

FIG. 5 is a flow diagram of an embodiment of a method 500 for assessing risk using a subset of percentile assignment data representing a top percentile. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by a risk analyzer 161 hosted by a fraud detection server 190 in FIG. 1. In one embodiment, processing logic has previously generated percentile assignment data that assigns a percentile to machine identifiers associated with previous transactions. The percentile assignment data can be re-populated periodically or upon request to maintain up-to-date information. One embodiment of generating percentile assignment data is described in greater detail below in conjunction with FIG. 6. In one embodiment, processing logic has created a copy of a subset of the percentile assignments. The copy of the subset of percentile assignments can be re-populated periodically or upon request to maintain up-to-date information. In one embodiment, the copy is of the top percentile assignments. In one embodiment, the top percentile is configured as ninety-five percentile and above. The copy of the top percentile assignments includes the machine identifiers assigned to the top percentile. Processing logic can store the copy of the top percentile, for example, in a file in a data store that is coupled to the risk analyzer.

At block 501, processing logic obtains transaction data for a transaction and identifies a machine identifier, such as an IP address, of the machine associated with the transaction from the transaction data at block 503. At block 505, processing logic determines whether the machine identifier associated with the transaction matches a machine identifier in the top percentile. A match in the top percentile (e.g., ninety-five percentile and above) can represent that the machine identifier used for the transaction is a frequently used machine identifier and that there is a low risk of fraud, if any, that is associated with the transaction.

In one embodiment, if there is a match (block 505), processing logic speeds up the process by allowing the transaction to continue at block 507, and the method ends without processing logic updating user behavior data (block 513) stored in a data to reflect the transaction. In another embodiment, processing logic allows the transaction to continue at block 507 and updates the user behavior data stored in a data store to reflect the transaction at block 513. In another embodiment, processing logic allows the transaction to continue at block 507 and reduces a current risk score (if any) for the transaction. The updates can indicate the risk analysis results and actions taken in response to this particular machine identifier.

If there is not a match in the subset of percentile assignment data (block 505), processing logic generates a risk score for the transaction at block 509. Processing logic can generate a risk score based on both a user-level analysis and a enterprise-level analysis. At block 511, processing logic determines whether to allow the transaction to continue based on the risk score. At block 513, processing logic updates user behavior data stored in a data store that is coupled to the risk analyzer to reflect the transaction.

Figure 6:
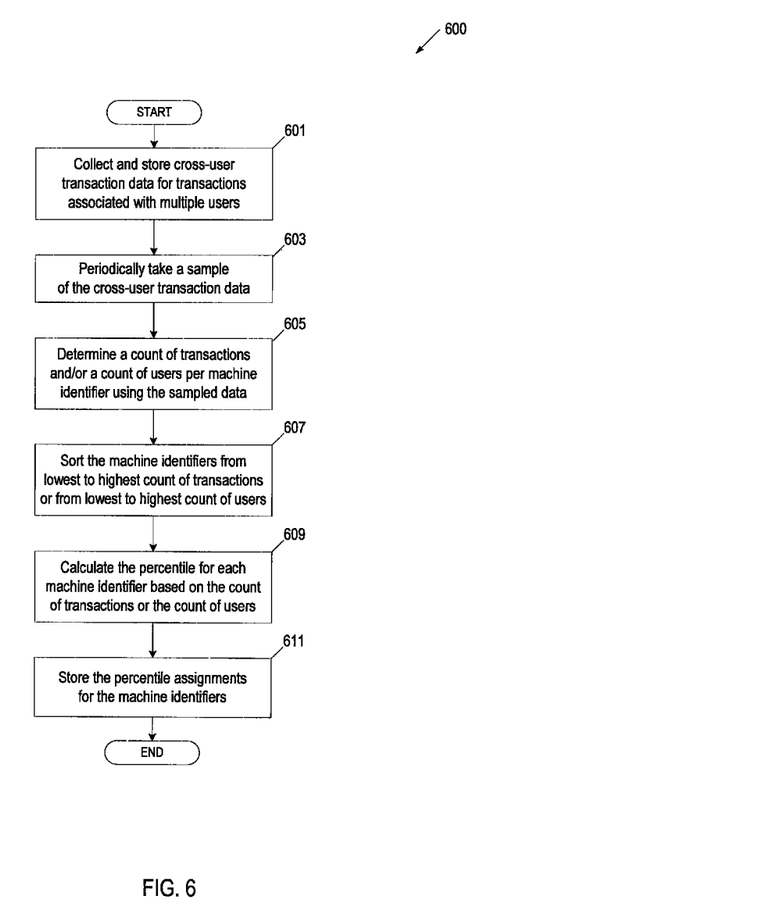
FIG. 6 is a flow diagram of an embodiment of a method for generating and/or updating percentile assignment data.

FIG. 6 is a flow diagram of an embodiment of a method 600 for generating and/or updating percentile assignment data. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by a risk analyzer 161 hosted by a fraud detection server 190 in FIG. 1.

At block 601, the processing logic collects and stores cross-user transaction data for transactions associated with multiple users and periodically takes a sample of the cross-user transaction data at block 603. The period can be pre-defined and configurable. For example, the sample may be taken once a month. The size of the sample can be pre-defined and configurable. A sample can be of part of the data for a time period. For example, the sample size may be some of the data for the previous three months. A sample can also be all of the data for a time period. For example, the sample size may be all of the data for the previous three months. At block 605, processing logic determines a count per machine identifier using the sampled data. The count can be a number of transactions per machine identifier or a number of distinct users per machine identifier. In one embodiment, processing logic calculates both a number of transactions per machine identifier and a number of distinct users per machine identifier to create to sets of percentile assignments. At block 607, processing logic sorts the machines identifiers, for example, in order from lowest to highest count per machine identifier. For instance, processing logic sorts the machine identifiers from lowest to highest number of transactions per machine identifier. In another example, processing logic sorts the machine identifiers from lowest to highest number of distinct users per machine identifier At block 609, processing logic creates a distribution of the machine identifiers by calculating the percentile of each machine identifier based on the count (e.g., number of transactions per machine identifier and/or number of distinct users per machine identifier). For example, processing logic determines that an IP address 217.35.123.8 has a count of 87 for a number of transactions. In this example, there is a total of 150 IP addresses. In one embodiment, the formula used to assign a percentile to each machine identifier based on the distribution is L/N(100)=P, where L is the number of machine identifiers with a number of transactions less than the count (e.g., count of 87), N is the total number of machine identifiers (e.g., 150 IP addresses) and P is the percentile. Processing logic counts the total number of machine identifiers that have transactions that are less than 87. For example, processing logic counts 113 machine identifiers having less than 87 transactions. In this example, L=113 and N=150. Processing logic divides L by N to get a decimal equivalent (e.g., 113/150=0.753). Processing logic multiples the result (e.g., result of L divided by N) by 100 (e.g., 0.753(100)=75.3). Processing logic can discard the digits to the right of the decimal point (e.g., 75.3 becomes 75) to represent the percentile rank of 75% for the IP address 217.35.123.8. At block 611, processing logic stores the percentiles assigned to the machine identifiers. In one embodiment, processing logic stores the percentile assignment for all of the machine identifiers in the data store. In another embodiment, processing logic stores a copy of the data of the top percentile in the data store. In another embodiment, processing logic stores a copy of the data of the bottom percentile in the data store. Storing a copy of a subset of percentile assignment can reduce the memory resources used to perform the risk analysis.

Method 600 can be a recursive method, such that processing logic can re-populate the percentile assignment data periodically or upon request to maintain up-to-date information.

Figure 7:
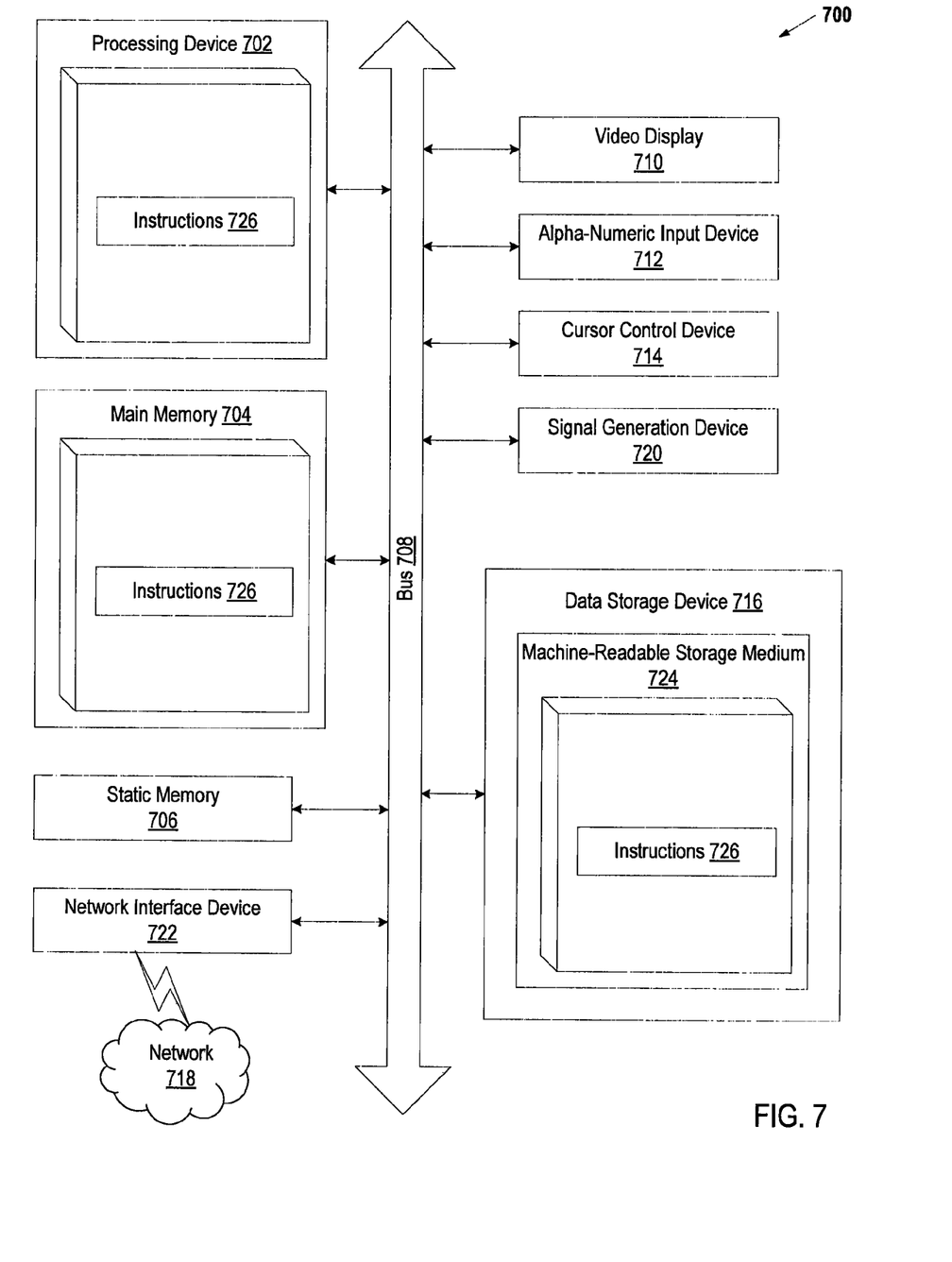
FIG. 7 is a diagram of one embodiment of a computer system for improving a risk assessment for a transaction using percentiles assigned to machine identifiers.

FIG. 7 is a diagram of one embodiment of a computer system for improving a risk assessment for a transaction using percentiles assigned to machine identifiers. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media. The instructions 726 may further be transmitted or received over a network 718 via the network interface device 722.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein (for example in relation to FIG. 2) can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining," "determining," "generating," "modifying," "decreasing," "increasing," "collecting," "creating," "assigning," "storing," "searching," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for improving a risk assessment for a transaction using percentiles assigned to machine identifiers is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

obtaining, by a processing device, data for a transaction pertaining to access to an application, the transaction data comprising a machine identifier of a machine associated with the transaction;

determining, by the processing device, at least one of a number of transactions for the machine identifier or a number of distinct users associated with the machine identifier;

determining, by the processing device, a percentile that is assigned to the machine identifier of the transaction based on the at least one of the number of transactions for the machine identifier or the number of distinct users for the machine identifier, and cross-user transaction data for a plurality of transactions associated with a plurality of users, the percentile representing a number of other machine identifiers from the cross-user transaction data that are related to the at least one of the number of transactions for the machine identifier or the number of distinct users for the machine identifier;

modifying, by the processing device, a user-level risk evaluation of the transaction based on the percentile assigned to the machine identifier;

determining, by the processing device, whether to intervene in the transaction based on the modified risk evaluation; and sending, by the processing device, a message to an application server via a network indicating at least one of the application server to allow the transaction or the application to terminate the transaction based on the determining whether to intervene in the transaction.

2. The method of claim 1, further comprising:

determining at least one of a number of transactions per machine identifier for a plurality of machine identifiers in the cross-user transaction data or a number of distinct users per machine identifier for the plurality of machine identifiers.

3. The method of claim 1, wherein modifying the user-level risk evaluation of the transaction comprises:

generating a user-level risk score for the transaction based on user behavior data; and modifying the user-level risk score based on the percentile.

4. The method of claim 3, wherein modifying the user-level risk score comprises:

determining that the percentile that is assigned to the machine identifier satisfies a percentile threshold; and at least one of decreasing the user-level risk score or increasing the user-level risk score.

5. The method of claim 4, wherein determining that the percentile that is assigned to the machine identifier satisfies the percentile threshold comprises:

determining that the percentile that is assigned to the machine identifier is greater than or equal to a ninety-five percentile.

6. The method of claim 4, wherein determining that the percentile that is assigned to the machine identifier satisfies the percentile threshold comprises:
determining that the percentile that is assigned to the machine identifier is less than or equal to a five percentile.

7. The method of claim 1, further comprising:
collecting the cross-user transaction data for the plurality of transactions associated with the plurality of users, wherein the cross-user transaction data comprises a machine identifier and a user for each of the plurality of transactions;
determining at least one of a number of transactions for each machine identifier in a plurality of machine identifiers in the cross-user transaction data or a number of distinct users for each machine identifier in the plurality of machine identifiers in the cross-user transaction data;
creating a distribution of the plurality of machine identifiers based on at least one of the number of transactions for each machine identifier or the number of distinct users for each machine identifier;
assigning a percentile to each machine identifier based on the distribution; and
storing the percentile assignments of the machine identifiers in a data store that is coupled to a computing system.

8. The method of claim 7, wherein determining the percentile that is assigned to the machine identifier of the transaction comprises:
searching the percentile assignments in the data store for the machine identifier that matches the machine identifier of the transaction.

9. A system comprising:
a memory; and
a processing device coupled with the memory to:
obtain, by the processing device, data for a transaction pertaining to access to an application, the transaction data comprising a machine identifier of a machine associated with the transaction;
determine, by the processing device, at least one of a number of transactions for the machine identifier or a number of distinct users associated with the machine identifier;
determine, by the processing device, a percentile that is assigned to the machine identifier of the transaction based on the at least one of the number of transactions for the machine identifier or the number of distinct users for the machine identifier, and cross-user transaction data for a plurality of transactions associated with a plurality of users, the percentile representing a number of other machine identifiers from the cross-user transaction data that are related to the at least one of the number of transactions for the machine identifier or the number of distinct users for the machine identifier;
modify, by the processing device, a user-level risk evaluation of the transaction based on the percentile assigned to the machine identifier;
determine, by the processing device, whether to intervene in the transaction based on the modified risk evaluation; and
send, by the processing device, a message to an application server via a network indicating at least one of the application server to allow the transaction or the application to terminate the transaction based on the determining whether to intervene in the transaction.

10. The system of claim 9, wherein the processing device is further to:
determine at least one of a number of transactions per machine identifier for a plurality of machine identifiers in the cross-user transaction data or a number of distinct users per machine identifier for the plurality of machine identifiers.

11. The system of claim 9, wherein to the processing device is to modify the user-level risk evaluation of the transaction by:
generating a user-level risk score for the transaction based on user behavior data; and
modifying the user-level risk score based on the percentile.

12. The system of claim 11, wherein the processing device is to modify the user-level risk score by:
determining that the percentile that is assigned to the machine identifier satisfies a percentile threshold; and
at least one of decreasing the user-level risk score or increasing the user-level risk score.

13. The system of claim 9, wherein the processing device is further to:
collect the cross-user transaction data for the plurality of transactions associated with the plurality of users, wherein the cross-user transaction data comprises a machine identifier and a user for each of the plurality of transactions;
determine at least one of a number of transactions for each machine identifier in a plurality of machine identifiers in the cross-user transaction data or a number of distinct users for each machine identifier in the plurality of machine identifiers in the cross-user transaction data;
create a distribution of the plurality of machine identifiers based on at least one of the number of transactions for each machine identifier or the number of distinct users for each machine identifier;
assign a percentile to each machine identifier based on the distribution; and
store the percentile assignments of the machine identifiers in a data store that is coupled to a computing system.

14. The system of claim 13, wherein to the processing device is to determine the percentile that is assigned to the machine identifier of the transaction by:
searching the percentile assignments in the data store for a machine identifier that matches the machine identifier of the transaction.

15. A non-transitory computer readable storage medium including instructions that, when executed by a processing device, cause the processing device to perform operations comprising:
obtaining, by the processing device, data for a transaction pertaining to access to an application, the transaction data comprising a machine identifier of a machine associated with the transaction;
determining, by the processing device, at least one of a number of transactions for the machine identifier or a number of distinct users associated with the machine identifier;
determining, by the processing device, a percentile that is assigned to the machine identifier of the transactions based on the at least one of the number of transactions for the machine identifier or the number of distinct users for the machine identifier, and cross-user transaction data for a plurality of transactions associated with a plurality of users, the percentile representing a number of machine identifiers from the cross-user transaction data that are related to the at least one of the number of transaction for the machine identifier or the number of distinct users for the machine identifier;

modifying, by the processing device, a user-level risk evaluation of the transaction based on the percentile assigned to the machine identifier;

determining, by the processing device, whether to intervene in the transaction based on the modified risk evaluation; and sending, by the processing device, a message to an application server via a network indicating at least one of the application server to allow the transaction or the application to terminate the transaction based on the determining.

16. The non-transitory computer readable storage medium of claim 15, the operations further comprising:

determining at least one of a number of transactions per machine identifier for a plurality of machine identifiers in the cross-user transaction data or a number of distinct users per machine identifier for the plurality of machine identifiers.

17. The non-transitory computer readable storage medium of claim 15, wherein modifying the user-level risk evaluation of the transaction comprises:

generating a user-level risk score for the transaction based on user behavior data; and modifying the user-level risk score based on the percentile.

18. The non-transitory computer readable storage medium of claim 17, wherein modifying the user-level risk score comprises:

determining that the percentile that is assigned to the machine identifier satisfies a percentile threshold; and at least one of decreasing the user-level risk score or increasing the user-level risk score.

19. The non-transitory computer readable storage medium of claim 15, further comprising:

collecting the cross-user transaction data for the plurality of transactions associated with the plurality of users, wherein the cross-user transaction data comprises a machine identifier and a user for each of the plurality of transactions;

determining at least one of a number of transactions for each machine identifier in a plurality of machine identifiers in the cross-user transaction data or a number of distinct users for each machine identifier in the plurality of machine identifiers in the cross-user transaction data;

creating a distribution of the plurality of machine identifiers based on at least one of the number of transactions for each machine identifier or the number of distinct users for each machine identifier;

assigning a percentile to each machine identifier based on the distribution; and storing the percentile assignments of the machine identifiers in a data store that is coupled to a computing system.

20. The non-transitory computer readable storage medium of claim 19, wherein determining the percentile that is assigned to the machine identifier of the transaction comprises:

searching the percentile assignments in the data store for the machine identifier that matches the machine identifier of the transaction.

* * * * *